United States Patent
Belanger et al.

(10) Patent No.: US 9,499,136 B2
(45) Date of Patent: Nov. 22, 2016

(54) LIGHTED WASH COMPONENT WITH A SLIP RING CONNECTOR

(71) Applicants: Michael J. Belanger, Northville, MI (US); Barry S. Turner, Novi, MI (US); Curtis S. Prater, Warren, MI (US); Michael S. Sayyae, Westland, MI (US)

(72) Inventors: Michael J. Belanger, Northville, MI (US); Barry S. Turner, Novi, MI (US); Curtis S. Prater, Warren, MI (US); Michael S. Sayyae, Westland, MI (US)

(73) Assignee: Belanger, Inc., Northville, MI (US)

( * ) Notice: Subject to any disclaimer, the term of this patent is extended or adjusted under 35 U.S.C. 154(b) by 265 days.

(21) Appl. No.: 14/471,839

(22) Filed: Aug. 28, 2014

(65) Prior Publication Data

US 2014/0366287 A1 Dec. 18, 2014

Related U.S. Application Data

(63) Continuation-in-part of application No. 14/456,636, filed on Aug. 11, 2014, which is a continuation-in-part of application No. 13/668,093, filed on Nov. 2, 2012, now Pat. No. 8,819,887.Provisional application No. 61/554,559, filed on Nov. 2, 2011, provisional application No. 61/556,893, filed on Nov. 8, 2011, provisional application No. 61/642,831, filed on May 4, 2012.

(51) Int. Cl.
*B60S 3/06* (2006.01)
*A46B 7/10* (2006.01)
(Continued)

(52) U.S. Cl.
CPC .............. *B60S 3/063* (2013.01); *A46B 13/001* (2013.01); *A46B 15/0002* (2013.01); *B60S 3/06* (2013.01); *B60S 3/066* (2013.01); *F21V 33/00* (2013.01); *A46B 2200/3046* (2013.01)

(58) Field of Classification Search
CPC .......... B60S 3/06; B60S 3/063; B60S 3/066; A46B 7/10; A46B 13/00; A46B 13/001; A46B 13/003; A46B 13/005; A46B 13/006; A46B 13/02; A46B 15/00; A46B 15/0055; A46B 2200/3046

USPC ........... 15/4, 53.1–53.4, 97.3, 179, 181–183, 15/230, 230.14, 230.16, 230.18, 230.19
See application file for complete search history.

(56) References Cited

U.S. PATENT DOCUMENTS

| | | |
|---|---|---|
| 5,134,742 A | 8/1992 | Ennis |
| 5,784,748 A | 7/1998 | Belanger et al. |

(Continued)

FOREIGN PATENT DOCUMENTS

| | | |
|---|---|---|
| JP | 410244911 A | 9/1998 |
| JP | 2001018767 A | 1/2001 |

(Continued)

OTHER PUBLICATIONS

Partial Machine Translation of JP 2001-18767, Jan. 23, 2001, 10 pages.

*Primary Examiner* — Mark Spisich
(74) *Attorney, Agent, or Firm* — John S. Artz; Dickinson Wright, PLLC (57) ABSTRACT

The lighted vehicle wash component includes a frame portion and a drive mechanism supported by the frame portion. The component also includes a rotatable hub portion supported by the frame portion. The hub portion is in communication with the drive mechanism to effectuate its rotation about an axis of rotation. The component includes a plurality of wash media elements engageable with the hub portion and which are configured to engage a vehicle surface as the hub portion rotates. The plurality of wash media elements are arranged on the hub portion in a plurality of spaced apart rows. The component includes a plurality of lighting elements removeably engaging the hub portion. The lighting elements are disposed in an open area defined between each of the plurality of spaced apart rows. A slip ring assembly is in communication with the hub portion to allow the plurality of lighting elements to rotate about the axis of rotation as the hub portion rotates.

25 Claims, 6 Drawing Sheets

(51) Int. Cl.
*A46B 13/00* (2006.01)
*F21V 33/00* (2006.01)
*A46B 15/00* (2006.01)

(56) References Cited

U.S. PATENT DOCUMENTS

| | | |
|---|---|---|
| 6,532,615 B2 | 3/2003 | Clark |
| 7,743,454 B2 | 6/2010 | Favagrossa |
| 8,495,786 B2 | 7/2013 | Naftal |
| 2004/0200024 A1 | 10/2004 | Yamin |
| 2006/0207047 A1 | 9/2006 | Weyandt |
| 2008/0078048 A1 | 4/2008 | Belanger |
| 2009/0250993 A1 | 10/2009 | Vivyan et al. |
| 2011/0138558 A1 | 6/2011 | Favaqgrossa |

FOREIGN PATENT DOCUMENTS

| | | |
|---|---|---|
| JP | 2005170221 A | 6/2005 |
| JP | 2007260379 A | 10/2007 |
| JP | 2008061723 A | 3/2008 |
| JP | 2009055960 A | 3/2009 |

LIGHTED WASH COMPONENT WITH A SLIP RING CONNECTOR

CROSS-REFERENCE TO RELATED APPLICATIONS

The present application is a continuation-in-part of U.S. patent application Ser. No. 14/456,636, entitled "Lighted Vehicle Wash Component", which was filed on Aug. 11, 2014, which is a continuation-in-part of U.S. patent application Ser. No. 13/668,093, entitled "Illuminated Hub for a Vehicle Wash Component", which was filed on Nov. 2, 2012, now U.S. Pat. No. 8,819,887,which claims priority to U.S. Provisional Patent Application Ser. No. 61/554,559, entitled "Car Wash Implement and Splayable Foam Plastic Element for Use in Constructing Same", which was filed on Nov. 2, 2011; U.S. Provisional Patent Application Ser. No. 61/556,893, entitled "Injection Molded Foamed Polymeric Car Wash Media", which was tiled on Nov. 8, 2011; and U.S. Provisional Patent Application Ser. No. 61/642,831, entitled "Top Brush", which was filed on May 4, 2012, the disclosures of which are all hereby incorporated by reference as though set forth fully herein.

TECHNICAL FIELD

The present disclosure relates generally to a vehicle wash component for use in cleaning a vehicle exterior in a vehicle wash facility. More specifically, the present disclosure relates to a lighted vehicle wash component for cleaning a vehicle exterior in a vehicle wash facility that yields enhanced aesthetics.

BACKGROUND OF THE DISCLOSURE

Vehicle wash facilities are generally known to have dark and dirty environments, which can make them unattractive to customers and potential customers. This environment results, in part, from the fact that current rotary brush components typically employ a cylindrical central hub design that is densely populated with a plurality of washing elements such that the hub is not visible either at rest or during operation. This densely populated hub also serves to block a great deal of light to a vehicle occupant as the wash component approaches the vehicle during the vehicle wash process due to the large volume of the washing elements. This can result in a significant darkening of the vehicle interior and an unpleasant wash experience for the vehicle occupant. Combine this darkness with windshields and side windows that are often covered with soapy water and visibility for vehicle occupants within current vehicle wash facilities is very low.

Consequently, some wash owners have made an attempt to brighten this environment and enhance a user's wash experience though the use of lighted arches and signs, to create somewhat of a "carnival" feel. Many vehicle wash facilities also employ lights and lighted signs as a way to advertise extra wash services like tire shine, sealer wax, and triple foam as well as to drive traffic to and create more revenue for their vehicle wash facility. While these lighted arches and lighted signs may be effective in drawing consumer attention to the wash or these extra services they offer, the lighting is very selective and does little to improve the overall environment within the vehicle wash facility. Moreover, because of the configuration of existing rotary brush components, which block a vehicle occupant from seeing these lights during the vehicle wash process as well as the low visibility in existing washes, these lights cannot be seen by vehicle occupants during the vehicle wash process. As such, these lights therefore do not assist in making the vehicle wash process less intimidating.

Another disadvantage of current vehicle wash configurations is that they share a largely similar, utilitarian appearance that makes it correspondingly difficult for wash owners to provide a distinctive or memorable service offering to their customers. Lighted arches and signs do little to overcome this problem as any attempted branding created thereby is obstructed to vehicle occupants during the wash process, as discussed above.

It would thus be desirable to provide a vehicle wash component that addresses these issues.

SUMMARY OF THE DISCLOSURE

It is therefore an aspect of the present disclosure to provide a lighted vehicle wash component that yields improved aesthetics within the vehicle wash facility.

It is another aspect of the present disclosure to provide a lighted vehicle wash component that enhances a customer's experience during the wash process.

It is a further aspect of the present disclosure to provide a lighted vehicle wash component that can help create brand recognition for a vehicle wash facility.

It is a still another aspect of the present disclosure to provide a lighted vehicle wash component that can brighten the environment within a vehicle wash facility.

It is yet another aspect of the present disclosure to provide a lighted vehicle wash component that yields enhanced brightness and aesthetics for a vehicle wash facility when the wash component is at rest.

In accordance with the above and the other aspects of the present disclosure, a lighted vehicle wash component is provided. The lighted vehicle wash component includes a frame portion and a drive mechanism supported by the frame portion. The component also includes a rotatable hub portion supported by the frame portion. The hub portion is in communication with the drive mechanism to effectuate its rotation about an axis of rotation. The component includes a plurality of wash media elements engageable with the hub portion and which are configured to engage a vehicle surface as the hub portion rotates. The plurality of wash media elements are arranged on the hub portion in a plurality of spaced apart rows. The component includes a plurality of lighting elements removeably engaging the hub portion. The lighting elements are disposed in an open area defined between each of the plurality of spaced apart rows. A slip ring assembly is in communication with the hub portion to allow the plurality of lighting elements to rotate about the axis of rotation as the hub portion rotates.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE DISCLOSURE

According to an aspect, the present disclosure relates to a treatment component for a vehicle wash system. The vehicle wash system may be configured as a tunnel car wash where a vehicle is conveyed through the wash process by a conveyor or the like as is known in the art. Alternatively, the vehicle wash system may be configured as a roll-over type where the vehicle remains stationary and the various treatment components may be translated and/or moved with respect to the vehicle to perform the vehicle wash process. Other suitable wash processes and systems may also be employed as are known. According to an aspect, the vehicle wash system may be housed within a vehicle wash facility having an entrance end where a vehicle enters, an exit end where the vehicle leaves, and a vehicle treatment area where the vehicle is cleaned. It will be appreciated that the disclosed treatment component could also be employed in connection with a variety of other applications outside of a vehicle wash system, such as a manual or self-serve wash process.

According to a further aspect, an exemplary vehicle wash system into which the disclosed component may be incorporated can include a plurality of vehicle wash components that engage and/or treat the exterior of a vehicle as it passes through the vehicle wash facility to effectuate a vehicle wash process. For example, the components can include a rinse arch, which sprays water onto a vehicle to wet the exterior surface for further processing. Another component can include a bubble device that generates bubbles and emits them directly onto a vehicle exterior in order to provide a supply of soap for cleaning purposes. An exemplary bubble device that may be employed with the disclosed system is contained in Applicant's co-pending U.S. patent application Ser. No. 13/864,813, entitled "A Vehicle Wash Component for Emitting Bubbles", filed Apr. 17, 2013, the disclosure of which is hereby incorporated by reference. Other suitable devices for generating bubbles or foam may also be employed. Other components may include one or more top brushes for contacting a top exterior surface of a vehicle, a plurality of side brushes for contacting side exterior surfaces of a vehicle and a plurality of wrap brushes for contacting front and back surfaces of a vehicle. Another component may include wheel scrubbers for engaging vehicle wheels. A further component that may be employed can include a drying apparatus for removing water from the vehicle exterior. According to a further aspect, the system can include a wheel polishing device for treating vehicle wheels.

It will be appreciated that more, less or different wash components may be employed. Additionally, multiples of the same components may be employed as part of the system, as desired. Further, the components may take on a variety of different configurations. Moreover, the order, placement and sequence of the components within the system may also vary. According to an aspect, the components may be designed to engage and/or treat a vehicle disposed within the vehicle treatment area of the vehicle wash facility.

Figure 1:
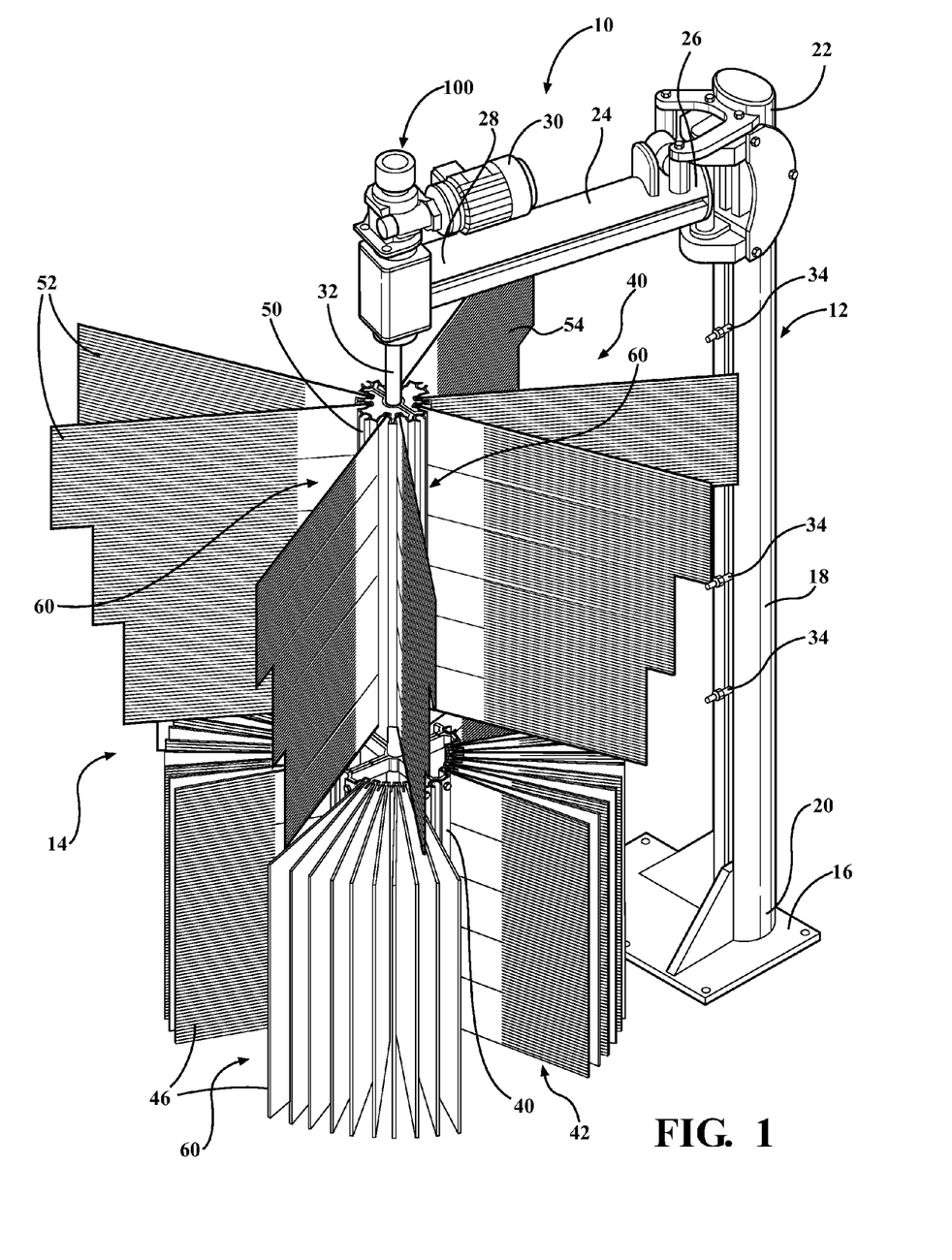
FIG. 1 is a perspective view of a lighted vehicle wash component in accordance with an aspect of the present disclosure.
Figure 2:
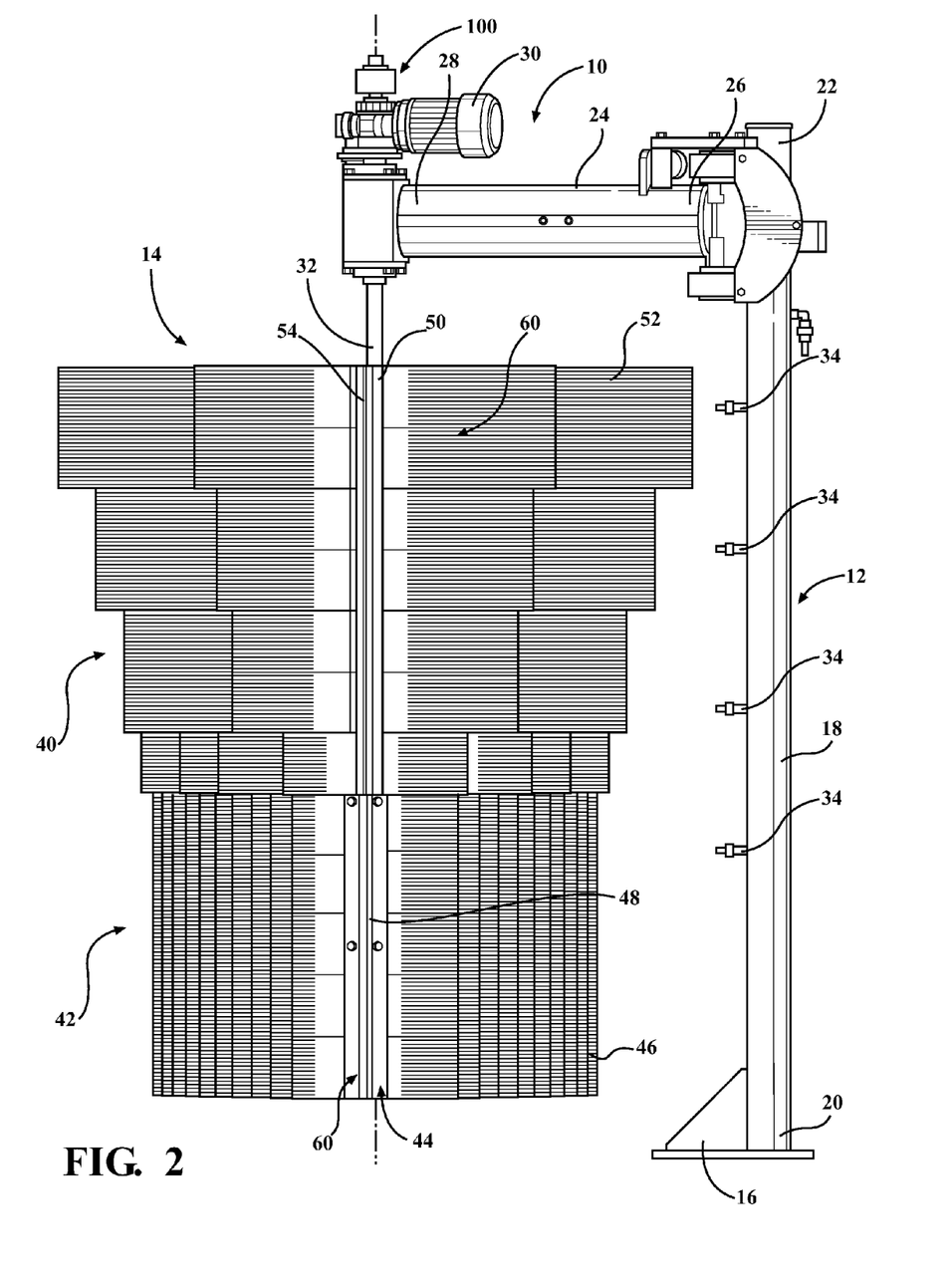
FIG. 2 is a side view of the lighted vehicle wash component of FIG. 1.

According to an aspect, the present disclosure relates to a lighted vehicle wash component 10 for treating an exterior surface of a vehicle, such as a painted surface. However, it will be appreciated that the component 10 can also treat other vehicle surfaces. With reference to FIGS. 1 and 2, the vehicle wash component 10 may be configured as a side brush so as to contact side surfaces of a vehicle. It will be appreciated that other types of brushes, such as top brushes (as discussed below), may also be employed. According to an aspect, the vehicle wash component 10 may broadly consist of a frame portion 12 and a brush portion 14 supported by the frame portion 12. The component 10 can be particularly suited for use in vehicle wash applications so that while it is being rotated by a suitable power source, such as a motor, it can be brought into contact with the exterior surface of a vehicle to perform a scrubbing or cleaning function to remove dirt or debris therefrom. It will be appreciated that the disclosed side brush can also perform other functions besides cleaning.

According to an aspect, the frame portion 12 can generally include a baseplate portion 16 and a vertical support 18. According to an aspect, the baseplate portion 16 may be a generally flat structure that may be mounted to a floor of the vehicle wash facility. The vertical support 18 may have a lower end 20 that connects to the baseplate portion 16 and an upper end 22 disposed away from the baseplate portion 16. A swingarm portion 24 having an inner end 26 and an outer end 28 may be connected to the upper end 22 of the vertical support 18 at its inner end 26. According to an aspect, the swingarm portion 24 may be pivotally connected to the vertical support 18 to allow for adjustments of the swingarm portion 24 so as to accommodate varying vehicle lengths. It will be appreciated that the frame 12 may consist of more or less components and may take on a variety of different configurations. In accordance with another aspect, the components of the frame 12 may be constructed of a metal material and may be powder-coated to resist against corrosion. Alternatively, the components of the frame 12 may be constructed of a plastic or other suitable non-metal material. All or portions of the frame 12 could alternatively be formed as a single integral structure. It will be appreciated that the frame 12 could be mounted in a variety of other suitable ways, including to the walls or the ceiling of the wash facility. It will also be appreciated that the component 10 may be disposed adjacent a vehicle treatment area of a vehicle wash facility.

According to an aspect, the brush portion 14 may be secured to the outer end 28 of the swingarm portion 24. The brush portion 14 may be configured to extend downwardly with respect to the swingarm portion 24 and can rotate about an axis that is oriented generally perpendicular to the swingarm portion 24. According to another aspect, the brush portion 14 may pivot with respect to the outer end 28 such as in response to contact with a vehicle exterior. This can allow the brush portion 14 to provide increased cleaning capabilities, but also minimize any damage that could result from the application of greater than intended forces thereto. According to a further aspect, the brush portion 14 may be rotated about its axis of rotation by a drive mechanism 30, which can include a drive shaft 32. The drive mechanism 30 may configured as an electric drive motor, however, a variety of other suitable drive motors or drive mechanism may be employed to effectuate rotation of the brush portion 14 at predetermined speeds. The drive mechanism 30 can also be operated by a control system, which can also operate other components in the vehicle wash system. A suitable control system can include a computer with a processor and suitable memory for storing encoded logic and executing same based on certain programmed criteria.

According to an aspect, the brush portion 14 may generally include an upper brush assembly 40 and a lower brush assembly 42 that are in communication with the drive shaft 32. The upper brush assembly 40 and the lower brush assembly 42 may rotate in unison in the same direction. Alternatively, they may rotate at different speeds. According to a further aspect, the brush assemblies 40, 42 could rotate in opposite directions at the same time. It will be appreciated that the component 10 could include more or less brush assemblies as desired. It will also be appreciated that the brush portion 14 could take on a variety of different configurations. The frame 12 can also include a plurality of spray orifices 34 for emitting a fluid such as water or soap onto the brush assemblies 40, 42. It will be appreciated that the spray orifices 34 may be employed to emit other fluids such as foam or chemicals.

The lower brush assembly 42 can include a hub portion 44, a plurality of wash media elements 46 in communication with the hub portion 44, and a plurality of illumination elements 48. Similarly, the upper brush assembly 40 can include a hub portion 50, a plurality of wash media elements 52 in communication with the hub portion 50, and a plurality of illumination elements 54. The hub portions 44, 50 may take on a variety of different configurations, may be formed of a variety of suitable materials, and may be formed from a variety of suitable processes. An exemplary hub portion configuration is described in Applicant's co-pending U.S. application Ser. No. 14/456,887, entitled "Lighted Vehicle Wash Component," and filed on Aug. 11, 2014, which is hereby incorporated by reference as though set forth fully herein.

According to another aspect, the wash media elements 46, 52 may be removeably secured to the hub portions 44, 50 by a variety of suitable mechanism. This removable attachment to the hub portions 44, 50 allows the media elements 46, 50 to be removed as desired such as for replacement purposes, while keeping them securely in place as the hub portions 44, 52 rotate. According to an aspect, the wash media elements 46 52 may be constructed of self-supporting materials such as foam so that they substantially retain their shape at all times and do not droop or sag while the vehicle wash component 10 is at rest. According to another aspect, the wash media elements 46, 52 may be constructed of a soft cloth material. It will be appreciated that the media elements may be formed of a variety of different materials and may have other suitable configurations. According to a further aspect, the media elements 46, 52 can have a variety of different configurations and may be secured to the hub portions 44, 52 in a variety of suitable ways. Exemplary wash media element configurations and methods of attachment of same are disclosed in Applicant's co-pending U.S. patent application Ser. No. 14/456,636 entitled "Lighted Vehicle Wash Component," and filed on Aug. 11, 2014, which is hereby incorporated by reference as though set forth fully herein.

According to another aspect, the media elements 46, 52 may be arranged on the hub portions 44, 50 in spaced apart rows such that there are open areas 60 between the spaced apart rows. As shown, the spaced apart rows and the open areas 60 may be oriented generally in a straight line and generally parallel to the axis or rotation. It will also be appreciated that the media elements 46, 52 may be arranged in rows having a variety of different configurations. According to a further aspect, the illumination elements 48, 54 may be disposed in the open areas 60 such that they may be visible between the rows of the media elements 46, 52. According to an aspect, the illumination elements 48, 54 may be secured to the hub portions 44, 50 in a variety of suitable ways. According to one aspect, the illumination elements 48, 54 may be clipped to the hub portions 44, 50 such as by a conventional clip. According to another aspect, the illumination elements 48, 54 may be removeably disposed in illumination element receptacles formed in the exterior surface of the hub portions 44, 50, which may be configured to receive at least one illumination element 48, 54 therein. It will be appreciated that the illumination elements may be secured to the hub portion in a variety of different ways and by a variety of different structures. Various combinations of attachment mechanism may also be employed. An exemplary illumination element receptacle is disclosed in Applicant's co-pending U.S. patent application Ser. No. 14/456,636 entitled "Lighted Vehicle Wash Component," and filed on Aug. 11, 2014, which is hereby incorporated by reference as though set forth fully herein.

Figure 3:
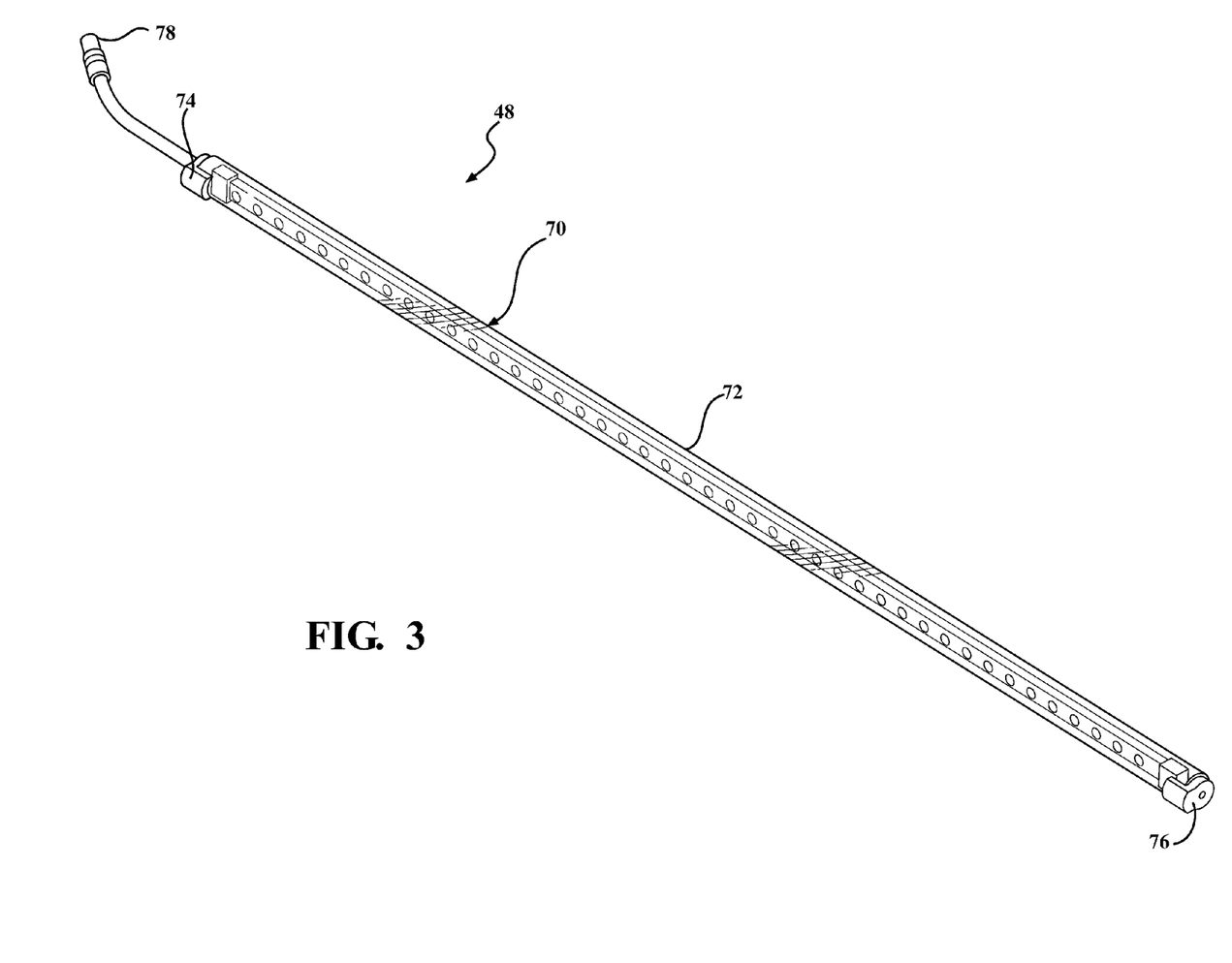
FIG. 3 is a perspective view of an illumination source in accordance with an aspect of the present disclosure.

According to an aspect and as shown in FIG. 3, the illumination elements 48, 54 could be configured as an elongated LED light strip 70. According to another aspect, the illumination elements 48, 54 could be configured to have a length that matches or substantially matches the length of the respective hub portions 44, 50 to which they are attached. Alternatively, the illumination elements 48, 54 could be configured with a length that is shorter or longer than the length of the hub portion 44, 50 to which they are attached. It will be appreciated that a variety of suitably configured light sources or illumination elements could be employed. According to a further aspect, the LED light strip 70 could be encased in a transparent outer tubing 72 that can provide protection for the LED light strip 70, including from water and chemicals that may exist in the vehicle wash process. The LED light strip 70 can also include an upper end cap 74 and a lower end cap 76 that may each be configured to engage an illumination receptacle in the hub portion as described in Applicant's co-pending U.S. patent application Ser. No. 14/456,636 entitled "Lighted Vehicle Wash Component," and filed on Aug. 11, 2014, which is hereby incorporated by reference as though set forth fully herein.

According to a further aspect, the LED light strip 70 can also include an electrical connector 78 that can allow for the provision of power thereto to effectuate illumination thereof. It will be appreciated that a variety of different types of illumination sources may be employed. It will also be appreciated that the illumination sources can have a variety of different sizes and configurations. As shown, the illumination elements can be uniformly spaced around the outer surface of the hub portions 44, 50, Any number of illumination elements may be employed and their location may obviously vary. However, according to an aspect, they may be secured to the hub portions 44, 50 in order that the illumination elements 48, 54 may rotate as the hub portions 44, 50 rotate, as discussed in more detail below.

Figure 4:
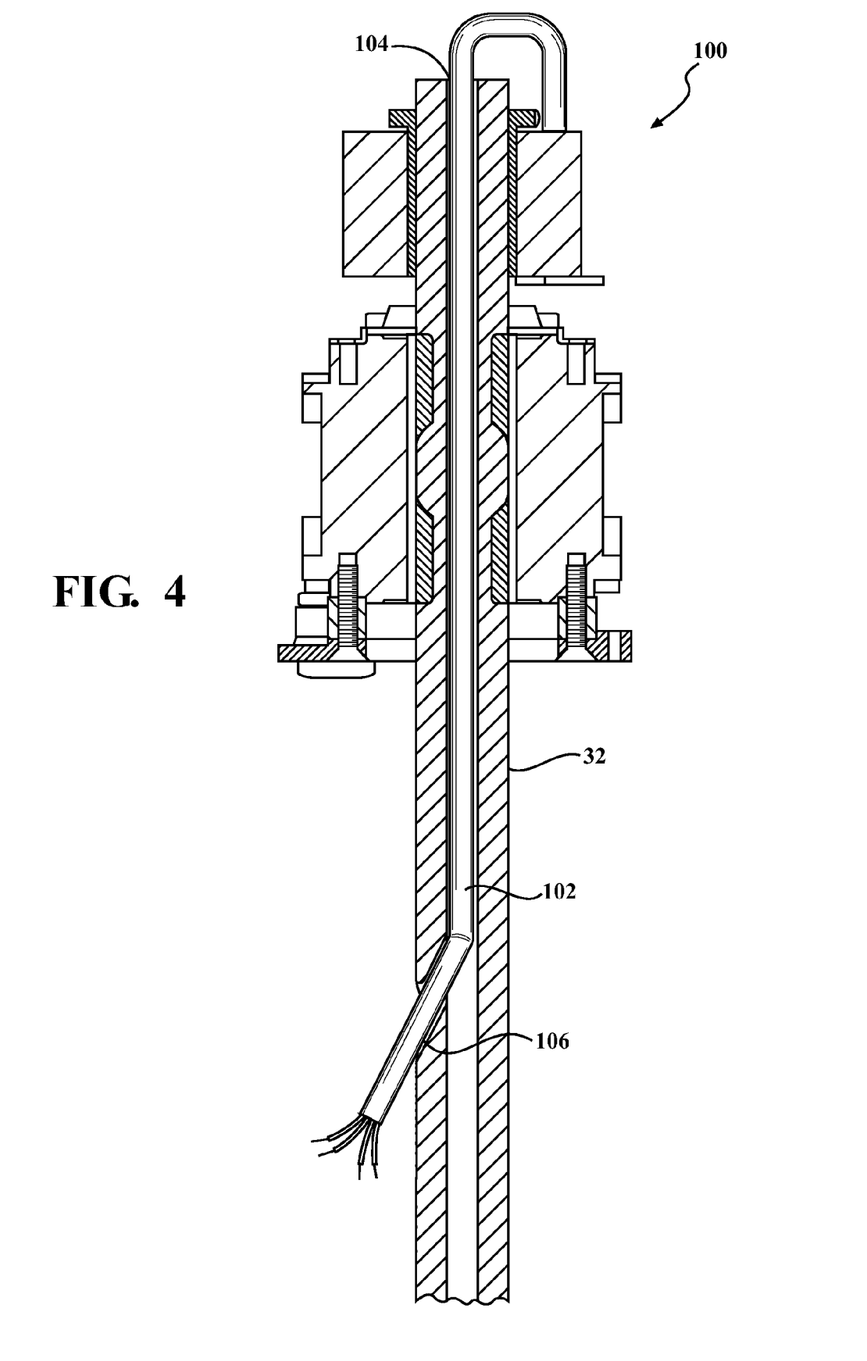
FIG. 4 is a schematic cross-sectional view of a drive assembly, including slip ring assembly, for a lighted vehicle wash component in accordance with an aspect of the present disclosure.

According to an aspect and with reference to FIG. 4, the plurality of illumination elements 48, 54 may be in communication with a slip ring assembly 100 so as to permit rotation of the illumination elements 48, 54 with their respective hub portion 44, 50 as they rotate. According to an aspect, the slip ring assembly 100 may be a conventional multi-channel assembly that accommodates providing electrical power to multiple electrical components at the same time with the connection from each individual component located in one of the separate channels being combined into a multi-conductor cable 102, as will be understood by one of ordinary skill in the art. According to an aspect, the multi-conductor cable 102 may extend from the slip ring assembly 100 downward through a hollow 104 formed in the drive shall 32. The conductor cable 102 may then exit the hollow 104 by way of a clearance opening 106 formed in a wall of the shaft 32 such that the electrical connections are available to the exterior of the drive shaft 32.

According to an aspect, the conductor cable 102 may be configured to make electrical connection with the connectors 78 of each of the illumination elements 48, 54 in parallel. This can be accomplished via a conventional wire harness as will be understood by one of ordinary skill in the art. It will be appreciated that these electrical connections can be accomplished in a variety of other suitable ways.

As will be appreciated, the component 10 may be provided with a power source, such as a DC power supply, which may, for example, consist of wires and/or cables from an off-board power supply. According to an aspect, the slip ring assembly 100 can thus provide electrical service from the wires or cables on the component 10 to the illumination elements 48, 54 carried by the hub portions 44, 50. By this arrangement, the slip ring assembly 100 can allow the hub portions 44, 50 to rotate around the axis without causing a "wind-up" problem of the electrical wires needed to power the illumination elements 48, 54 that are configured to rotate therewith. It will be appreciated that other electrical devices can be carried by the hub portions 44, 50, including sensors or limit switches to provide signals to the control system to provide a variety of different feedbacks regarding the brush assembly itself or an associated vehicle with which the brush communicates.

Figure 5:
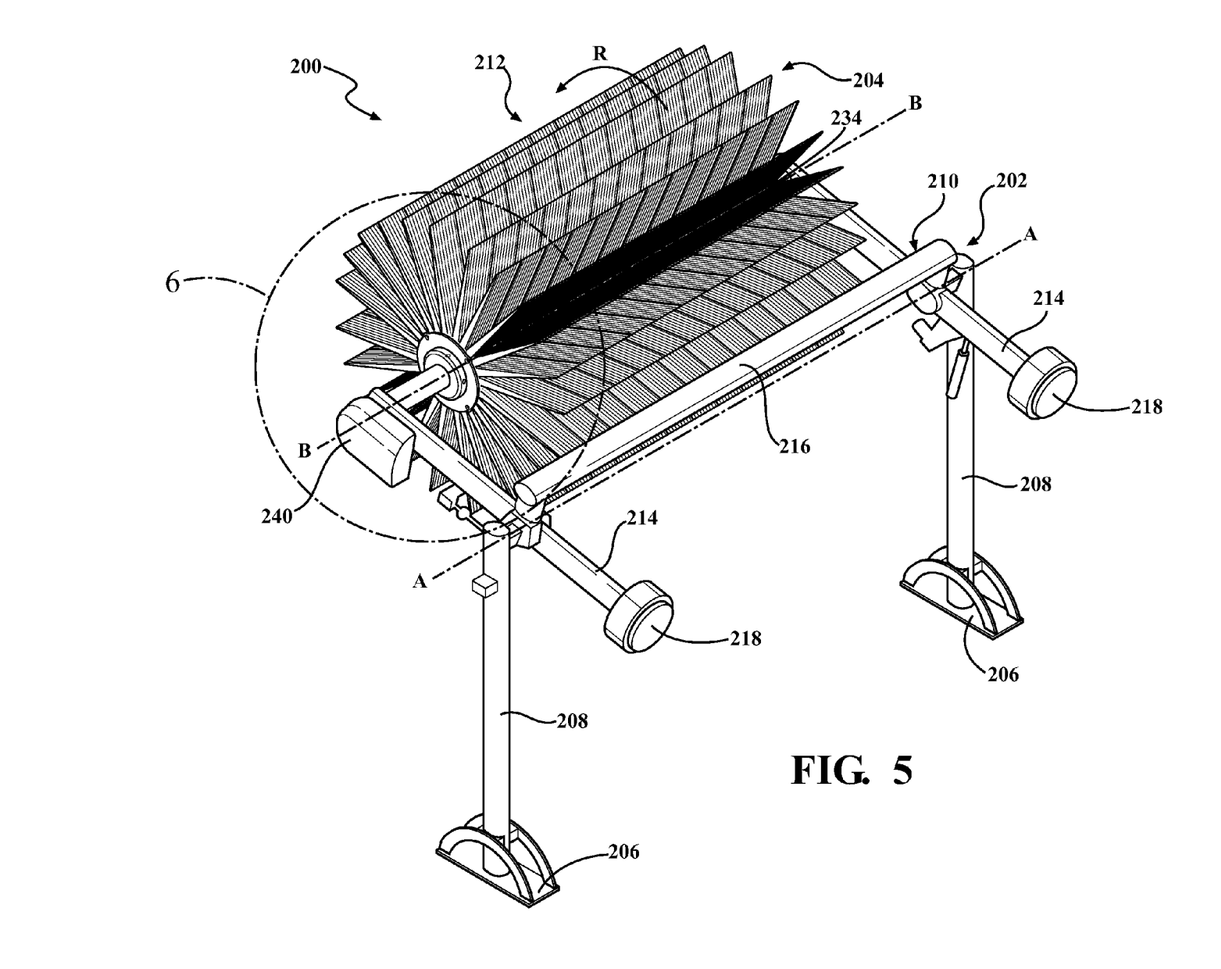
FIG. 5 is a perspective view of the lighted vehicle wash component in accordance with another aspect of the present disclosure.
Figure 6:
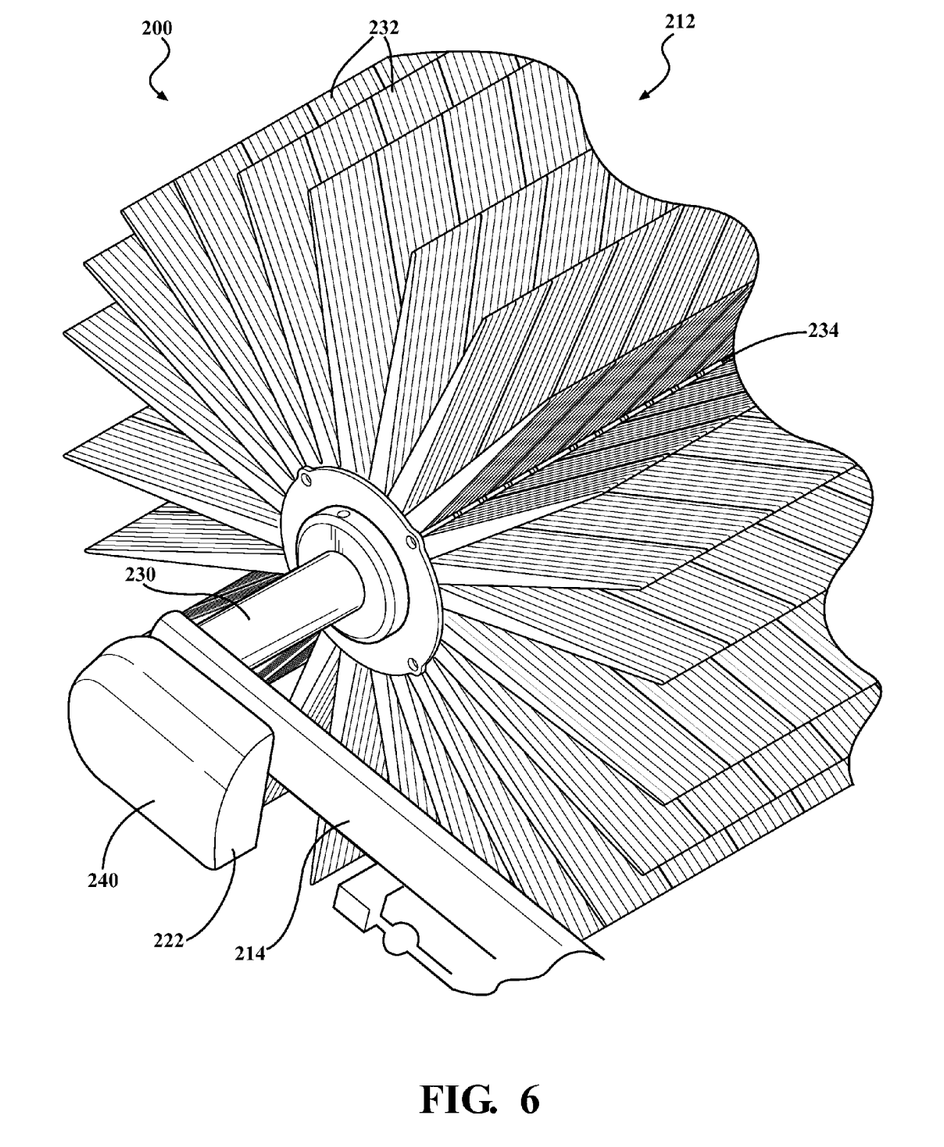
FIG. 6 is an enlarged view of a portion of the lighted vehicle wash component, including slip ring assembly of FIG. 5.

With reference to FIGS. 5 and 6, the vehicle wash component 200 may be a top brush configured to contact a top surface of a vehicle. According to an aspect, the vehicle wash component 200 may broadly consist of a frame 202 and a brush portion 204 supported by the frame 202. The component 200 can be particularly suited for use in vehicle wash applications so that while it is being rotated by a suitable power source, such as a motor, it can be brought into contact with the exterior surface of a vehicle to perform a scrubbing or cleaning function to remove dirt or debris therefrom. It will be appreciated that the disclosed top brush can also perform other functions besides cleaning.

According to an aspect, the frame 202 can generally include a pair of baseplate portions 206 and a pair of vertical supports 208. It will be appreciated that the frame 202 may consist of more or less components. In accordance with another aspect, the components of the frame 202 may be constructed of a metal material and may be powder-coated to resist against corrosion. Alternatively, the components of the frame 202 may be constructed of a plastic or other suitable non-metal material. All or portions of the frame 202 could alternatively be formed as a single integral structure. It will be appreciated that the frame 202 could be mounted in a variety of other suitable ways, including to the walls or the ceiling of the wash facility. An exemplary frame is described in detail in Applicant's co-pending U.S. patent application Ser. No. 14/456,636 entitled "Lighted Vehicle Wash Component," and filed on Aug. 11, 2014, which is hereby incorporated by reference as though set forth fully herein.

According to an aspect, the brush portion 204 may include a generally u-shaped counterbalance frame 210 for supporting a brush assembly 212. According to a further aspect, the u-shaped frame 210 may be pivotally connected to the frame 202 and can include a pair of pivotal arm portions 214 and a cross-support arm 216 that may extend between the pivotal arm portions 214. Pursuant to a further aspect, a counter-balance weight 218 may be secured to each of the arm portions 214 to allow pivotal rotation of the arms about an axis A-A so as to raise and lower the brush assembly 212 mounted on the cross-support arm 216. The brush assembly 212 may be driven in rotation about an axis B-B in the direction of the arrow R by a suitable control mechanism as dictated by a control system. A suitable control system can include a computer with a processor and suitable memory for storing encoded logic and executing same based on certain programmed criteria. In operation, the brush assembly 212 may be moved between a vehicle engaging position and a retracted position under computer control by actuating cylinders, such as hydraulic or pneumatic cylinders, which can extend between the pivotal arm portions 214 and the vertical supports 208. According to another aspect, the brush assembly 212 may be moved and controlled in a variety of other suitable ways. In accordance with an aspect, a drive mechanism 222 may be in communication with the brush assembly 204 to cause rotation thereof at predetermined speeds in the direction R. The motor can also be operated by the control system.

According to an aspect, the brush assembly 212 may generally include a hub portion 230 and a plurality of wash media segments 232. The brush assembly 212 may have a variety of different configurations and the plurality of wash media segments 232 may be secured for communication with the hub portion 230 in a variety of suitable ways. Exemplary brush assembly configurations and wash media segment configurations and securing apparatus are disclosed in Applicant's co-pending U.S. application Ser. No. 14/456, 636 entitled "Lighted Vehicle Wash Component," and filed on Aug. 11, 2014, which is hereby incorporated by reference as though set forth fully herein.

According to an aspect, the hub portion 230 can generally extend between the pivotal arm portions 214. The hub portion 230 may be in communication with a drive mechanism 222 to effectuate rotation thereof, as will be understood by one of ordinary skill. It will be appreciated that more or less wash media segments may be employed. It will also be appreciated that the wash media segments 232 could have different shapes, sizes, and configurations.

In accordance with another aspect, the brush assembly 212 may include a plurality of illumination elements or light elements 234 interspersed amongst the wash media elements 232. According to another aspect, each of the plurality of light elements 234 may be disposed between adjacent rows of the plurality of media elements 232. According to one aspect, the wash media elements 232 may be oriented on the hub portion 230 such that linear rows are created and whereby each of the light elements 234 may be oriented in a linear fashion between selected rows. It will be appreciated that any number of light sources may be employed as part of the component 200. According to an aspect, the light elements 234 may be disposed on the brush assembly 212 so that light emitted from the light elements 234 may be visible from the exterior of the component 200 at all times, including when the component is rotating. Exemplary configurations of lighting dements and their placement and attachment are disclosed in Applicant's co-pending U.S. application Ser. No. 14/456,636 entitled "Lighted Vehicle Wash Component," and filed on Aug. 11, 2014, which is hereby incorporated by reference as though set forth fully herein.

According to an aspect, the illumination elements 234 may be LED strips, consisting of individual LEDs that are connected through a slip ring assembly 240 to a power source so as to emit light from the brush assembly 212 during brush operation. The utilization of the slip ring assembly 240 can allow illumination elements 234 to be mounted for rotation with the hub portion 230 as it rotates without any "windup" of electrical wires. The slip ring assembly 240 may have the same configuration and operate the same as the slip ring assembly 100 as described above.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure, Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A vehicle wash system, comprising:
   a vehicle wash component, including:
   a frame portion;
   a drive mechanism supported by the frame portion;
   a rotatable hub portion supported by the frame portion and in communication with the drive mechanism to effectuate rotation of the hub portion about an axis of rotation;
   a plurality of wash media elements engageable with the hub portion and configured to engage a vehicle surface as the hub portion rotates;
   at least one lighting element disposed on the hub portion, the at least one lighting element disposed in an open area defined between the plurality of wash media elements; and
   a slip ring assembly in communication with the rotatable hub portion to provide power to the at least one lighting element such that it may be illuminated and rotate about the axis of rotation as the hub portion rotates.

2. The system of claim 1, further comprising:
   a plurality of lighting elements disposed on the hub portion, wherein each of the plurality of lighting elements is disposed in a separate open area defined between the plurality of wash media elements.

3. The system of claim 2, wherein the slip ring assembly includes a plurality of channels to allow power to be supplied to each of the lighting elements such that they each may be illuminated and rotate about the axis of rotation as the hub portion rotates.

4. The system of claim 3, wherein the slip ring assembly is disposed on the frame portion.

5. The system of claim 1, wherein the hub portion includes a hollow middle portion and an electrical connection from the slip ring assembly passes through the hollow portion for connection with the at least one lighting element.

6. The system of claim 1, wherein the axis of rotation is oriented generally vertical to ground.

7. The system of claim 1, wherein the axis of rotation is oriented generally horizontal to ground.

8. The system of claim 1, wherein the plurality of media elements are arranged in a plurality of spaced apart rows, which are oriented parallel to the axis of rotation.

9. The system of claim 1, wherein the at least one lighting element is removeably secured to the hub portion.

10. The system of claim 9, wherein the at least one lighting element is mechanically clipped to the hub portion such that it is disposed in a respective open area.

11. The system of claim 9, wherein the at least one lighting element is secured in a retaining channel formed in the hub portion.

12. A vehicle wash component, comprising:
    a frame portion;
    a drive mechanism supported by the frame pardon;
    a rotatable hub portion supported by the frame portion and in communication with the drive mechanism to effectuate rotation of the hub portion about an axis of rotation;
    a plurality of wash media elements engageable with the hub portion are configured to engage a vehicle surface as the hub portion rotates;
    a plurality of lighting elements disposed on the hub portion, the plurality of lighting elements disposed in a plurality of open areas defined between each of the wash media elements; and
    a slip ring assembly disposed on the frame and in communication with the rotatable hub portion, the slip ring assembly configured to make an electrical connection between a power source and the plurality of lighting elements to permit their illumination while rotating about the axis of rotation.

13. The component of claim 12, wherein the hub portion includes a hollow middle portion and the electrical connection from the slip ring assembly passes through the hollow portion for connection with the plurality of lighting elements.

14. The component of claim 12, wherein the axis of rotation is oriented generally vertical to ground.

15. The component of claim 12, wherein the axis of rotation is oriented generally horizontal to ground.

16. The component of claim 12, wherein the plurality of media elements are arranged in a plurality of spaced apart rows, which are oriented parallel to the axis of rotation.

17. The component of claim 12, wherein the plurality of lighting elements are removeably secured to the hub portion.

18. The component of claim 17, wherein the plurality of lighting elements are mechanically clipped to the hub portion such that they are disposed in each of the plurality of open areas.

19. The component of claim 17, wherein the plurality of lighting elements are secured in retaining channels formed in the hub portion.

20. A vehicle wash component, comprising:
a rotatable hub portion having an axis of rotation;
a drive mechanism in communication with the hub portion to effectuate rotation thereof about the axis of rotation;
a plurality of self-supporting wash media elements secured to the hub portion that extend generally perpendicular from the hub portion, the plurality of wash media elements being arranged in a plurality of spaced apart arrays, which define open areas between the adjacent ones of the plurality of spaced apart arrays;
a plurality of lighting elements disposed in the open areas and secured to the hub portion for rotation therewith;
a slip ring assembly in communication with the hub portion and configured to effectuate electrical connection between a power source and the lighting elements to permit their illumination while the hub portion rotates about the axis of rotation.

21. The component of claim 20, wherein the hub portion includes a hollow middle portion and the electrical connection from the slip ring assembly passes through the hollow portion for connection with the plurality of lighting elements.

22. The component of claim 20, wherein the plurality of lighting elements are removeably secured to the hub portion.

23. The component of claim 20, wherein the plurality of lighting elements are mechanically clipped to the hub portion.

24. The component of claim 20, wherein the plurality of lighting elements are disposed in retaining channels formed in the hub portion.

25. The component of claim 20, wherein the plurality of lighting elements are configured as LED strips.

* * * * *